US008058830B2

(12) United States Patent
John et al.

(10) Patent No.: US 8,058,830 B2
(45) Date of Patent: Nov. 15, 2011

(54) CHARGING ENERGY SOURCES WITH A RECTIFIER USING DOUBLE-ENDED INVERTER SYSTEM

(75) Inventors: George John, Cerritos, CA (US); Sibaprasad Chakrabarti, Torrance, CA (US); Brian A. Welchko, Torrance, CA (US); Gregory S. Smith, Woodland Hills, CA (US); James M. Nagashima, Cerritos, CA (US); Milun Perisic, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 602 days.

(21) Appl. No.: 12/136,636

(22) Filed: Jun. 10, 2008

(65) Prior Publication Data
US 2009/0033255 A1 Feb. 5, 2009

Related U.S. Application Data

(60) Provisional application No. 60/952,737, filed on Jul. 30, 2007.

(51) Int. Cl.
*H02P 1/00* (2006.01)
(52) U.S. Cl. ......... 318/440; 318/107; 318/722; 318/724
(58) Field of Classification Search ................... 318/440, 318/105, 107, 722, 724; 180/65.1, 65.3, 180/65.8; 363/40, 41, 52, 55, 56.06, 71
See application file for complete search history.

(56) References Cited

U.S. PATENT DOCUMENTS

| | | | | |
|---|---|---|---|---|
| 5,343,970 A | * | 9/1994 | Severinsky | 180/65.25 |
| 5,345,761 A | * | 9/1994 | King et al. | 60/274 |
| 5,389,749 A | | 2/1995 | Hokari et al. | |
| 5,973,460 A | * | 10/1999 | Taga et al. | 318/139 |
| 6,892,541 B2 | * | 5/2005 | Suzuki | 60/706 |
| 7,009,856 B2 | * | 3/2006 | Moon et al. | 363/37 |
| 7,130,205 B2 | | 10/2006 | Peng | |
| 7,154,237 B2 | | 12/2006 | Welchko et al. | |
| 7,199,535 B2 | | 4/2007 | Welchko et al. | |
| 7,294,984 B2 | * | 11/2007 | Urakabe et al. | 318/378 |
| 7,690,456 B2 | * | 4/2010 | Deng et al. | 180/65.265 |

(Continued)

OTHER PUBLICATIONS

Singh, G.K., "Multi-Phase Induction Machine Drive Research—A Survey," Elsevier Science B.V., Electric Power Systems Research, 2002, pp. 139-147.

(Continued)

*Primary Examiner* — Walter Benson
*Assistant Examiner* — Thai Dinh
(74) *Attorney, Agent, or Firm* — Ingrassia Fisher & Lorenz P.C.

(57) ABSTRACT

Systems and methods are provided for charging energy sources with a rectifier using a double-ended inverter system. An apparatus is provided for an electric drive system for a vehicle. The electric drive system comprises an electric motor configured to provide traction power to the vehicle. A first inverter is coupled to the electric motor and is configured to provide alternating current to the electric motor. A first energy source is coupled to the first inverter, wherein the first inverter is configured to provide power flow between the first energy source and the electric motor. A second inverter is coupled to the electric motor and is configured to provide alternating current to the electric motor. A rectifier is coupled to the second inverter and configured to produce a direct current output. The second inverter is configured to provide power from the rectifier to the electric motor.

6 Claims, 4 Drawing Sheets

U.S. PATENT DOCUMENTS 7,800,331 B2 * 9/2010 Chakrabarti et al. ......... 318/440
2005/0231152 A1 * 10/2005 Welchko et al. ............. 318/801

OTHER PUBLICATIONS

Peng, Fang Zheng, "Z-Source Inverter," IEEE Transactions on Industry Applications, Mar./Apr. 2003, vol. 39, No. 2, pp. 504-510.

Jones, Martin et al., "A Six-Phase Series-Connected Two-Motor Drive With Decoupled Dynamic Control," IEEE Transactions on Industry Applications, Jul./Aug. 2005, vol. 41, No. 4, pp. 1056-1066.

Welchko, Brian A., "A Double-Ended Inverter System for the Combined Propulsion and Energy Management Functions in Hybrid Vehicles with Energy Storage," The 31st Annual Conference of the IEEE Industrial Electronics Society, IECON '05, Raleigh, North Carolina, Nov. 6-10, 2005, pp. 1-6.

Levi, Emil et al., "A Series-Connected Two-Motor Six-Phase Drive With Induction and Permanent Magnet Machines," IEEE Transactions on Energy Conversion, Mar. 2006, vol. 21, No. 1, pp. 121-129.

* cited by examiner

CHARGING ENERGY SOURCES WITH A RECTIFIER USING DOUBLE-ENDED INVERTER SYSTEM

CROSS-REFERENCE TO RELATED APPLICATION(S)

This application claims the benefit of U.S. provisional patent application Ser. No. 60/952,737, filed Jul. 30, 2007.

TECHNICAL FIELD

Embodiments of the subject matter described herein relate generally to vehicle drive systems, and more particularly, embodiments of the subject matter relate to hybrid vehicles having a double-ended inverter drive system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles. Electric and/or hybrid vehicles may be designed to use electrical energy as a primary source of traction power. However, the supply of electrical energy and thus the achievable range of operation of the vehicle are limited based on the components selected as energy sources.

Many of the electrical components, including the electric motors used in such vehicles, receive electrical power from alternating current (AC) power supplies. However, the power sources (e.g., batteries) used in such applications provide only direct current (DC) power. Thus, devices known as "power inverters" are used to convert the DC power to AC power, which often utilize several of switches, or transistors, operated at various intervals to convert the DC power to AC power.

Additionally, such vehicles, particularly fuel cell vehicles, often use two separate voltage sources (e.g., a battery and a fuel cell) to power the electric motors that drive the wheels. "Power converters," such as direct current-to-direct current (DC/DC) converters, are typically used to manage and transfer the power from the two voltage sources. Modern DC/DC converters often include transistors electrically interconnected by an inductor. By controlling the states of the various transistors, a desired average current can be impressed through the inductor and thus control the power flow between the two voltage sources.

The utilization of both a power inverter and a power converter greatly increases the complexity of the electrical system of the automobile. The additional components required for both types of devices also increase the overall cost and weight of the vehicle. Accordingly, systems and methods have been developed for operating a motor coupled to multiple power sources without a DC/DC converter while maximizing the performance of the motor by utilizing dual inverter electrical systems.

BRIEF SUMMARY

An apparatus is provided for an electric drive system for a vehicle. The electric drive system comprises an electric motor configured to provide traction power to the vehicle. A first inverter is coupled to the electric motor and is configured to provide alternating current to the electric motor. A first energy source is coupled to the first inverter, wherein the first inverter is configured to provide power flow between the first energy source and the electric motor. A second inverter is coupled to the electric motor and is configured to provide alternating current to the electric motor. A rectifier is coupled to the second inverter and configured to produce a direct current output. The second inverter is configured to provide power from the rectifier to the electric motor.

An apparatus is provided for an automotive drive system. The automotive drive system comprises an electric motor configured to provide traction power. A first inverter is coupled to the electric motor and is configured to provide alternating current to the electric motor. A first energy source is coupled to the first inverter, wherein the first inverter is configured to provide power flow between the first energy source and the electric motor. A second inverter is coupled to the electric motor and is configured to provide alternating current to the electric motor. A second energy source is coupled to the second inverter, wherein the second inverter is configured to provide power flow between the second energy source and the electric motor. A rectifier is coupled between the first energy source and the first inverter, such that the rectifier and the first energy source are electrically parallel, wherein the rectifier is configured to produce a direct current output.

A method is provided for controlling an electric motor using a double-ended inverter system coupled to a first energy source and a rectifier. The rectifier is coupled to a generator which is coupled to an internal combustion engine. The method comprises modulating the double-ended inverter system to provide power to the electric motor from the first energy source and monitoring a state of charge of the first energy source. If the state of charge is less than a threshold value, the method further comprises providing power to the double-ended inverter system from the internal combustion engine through the generator.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown herein depict exemplary arrangements of elements, additional intervening elements, devices, features, or components may be present in an embodiment of the depicted subject matter. Furthermore, the terms "first", "second" and other such numerical terms referring to structures do not imply a sequence or order unless clearly indicated by the context.

For the sake of brevity, conventional techniques related to signaling, sensors, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to systems and methods for improving fuel efficiency of a vehicle using a double-ended inverter system. An electrical energy source may be utilized as the primary energy source for traction power and a range extending internal combustion engine may be used to operate the motor and recharge the energy source as needed during operation of the vehicle.

Figure 1:
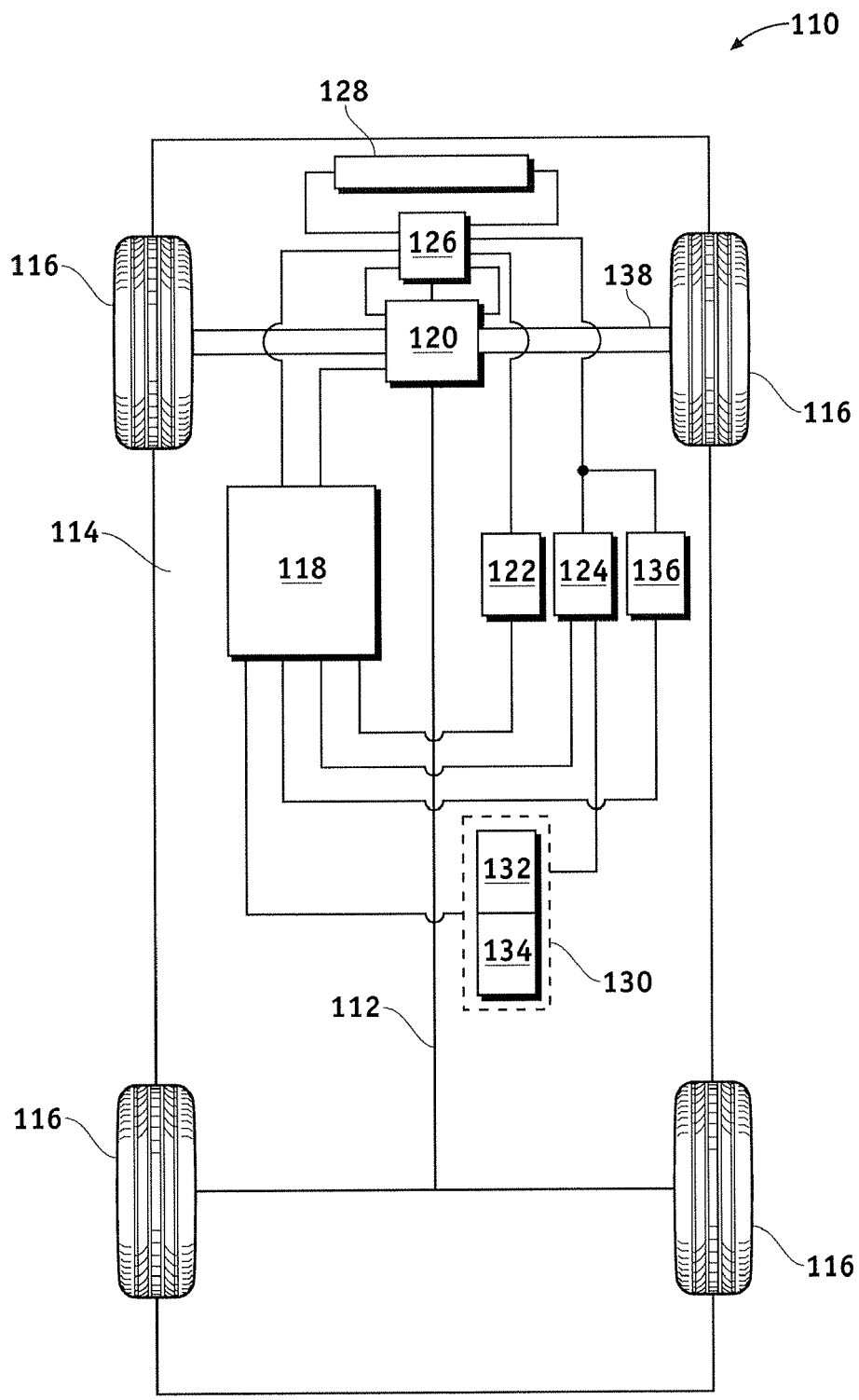
FIG. 1 is a block diagram of an exemplary automobile in accordance with one embodiment.

Referring now to FIG. 1, a vehicle, or automobile 110, according to one embodiment includes a chassis 112, a body 114, four wheels 116, and an electronic control system 118. The body 114 is arranged on the chassis 112 and substantially encloses the other components of the automobile 110. The body 114 and the chassis 112 may jointly form a frame. The wheels 116 are each rotationally coupled to the chassis 112 near a respective corner of the body 114.

The automobile 110 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 110 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, the automobile 110 further includes a motor 120 (i.e., an electric motor/generator, traction motor, etc.), a first energy source 122, a rectifier 124, a power inverter assembly 126, a radiator 128, and a generator set 130. The generator set 130 includes a generator 132 and an engine 134, as described in greater detail below. In various embodiments, the automobile 110 may also include a second energy source 136. During operation, the automobile 110 is operated by providing power to the wheels 116 with the motor 120 which receives power from the first energy source 122, the rectifier 124, and/or the second energy source 136 in an alternating manner and/or simultaneously.

As shown, the first energy source 122 and the rectifier 124 are in operable communication and/or electrically coupled to the electronic control system 118 and the power inverter assembly 126. In accordance with one or more embodiments, the second energy source 136 is coupled to the power inverter assembly 126 electrically parallel to the rectifier 124 and in operable communication with the electronic control system 118. In an exemplary embodiment, the rectifier 124 is coupled to the generator set 130 as described in greater detail below.

Although not illustrated, the energy sources 122, 136 may vary depending on the embodiment and may be of the same or different type. In practice, the energy sources 122, 136 may comprise a battery, a fuel cell, an ultracapacitor, or another suitable voltage source. The battery may be any type of battery suitable for use in a desired application, such as a lead acid battery, a lithium-ion battery, a nickel-metal battery, or another rechargeable battery.

In an exemplary embodiment, the motor 120 is a multi-phase alternating current (AC) motor and includes a set of windings (or coils), wherein each winding corresponds to one phase of the motor 120. Although not illustrated, the motor 120 includes a stator assembly (including the coils), a rotor assembly (including a ferromagnetic core), and a cooling fluid (i.e., coolant), as will be appreciated by one skilled in the art. The motor 120 may be an induction motor, a permanent magnet motor, or any type suitable for the desired application. As shown in FIG. 1, the motor 120 may also include a transmission integrated therein such that the motor 120 and the transmission are mechanically coupled to at least some of the wheels 116 through one or more drive shafts 138.

In an exemplary embodiment, the radiator 128 is connected to the frame at an outer portion thereof and although not illustrated in detail, includes multiple cooling channels that contain a cooling fluid (i.e., coolant), such as water and/or ethylene glycol (i.e., "antifreeze"), and is coupled to the power inverter assembly 126 and the motor 120. In one embodiment, the power inverter assembly 126 receives and shares coolant with the motor 120. In alternative embodiments, the power inverter assembly 26 and/or the motor 120 may be air-cooled.

In an exemplary embodiment, the electronic control system 118 is in operable communication with the motor 120, the first energy source 122, the rectifier 124, the power inverter assembly 126, the generator set 130, and/or the second energy source 136. Although not shown in detail, the electronic control system 118 may include various sensors and automotive control modules, or electronic control units (ECUs), such as an inverter control module, and a vehicle controller, and at least one processor and/or a memory which includes instructions stored thereon (or in another computer-readable medium) for carrying out the processes and methods as described below.

Figure 2:
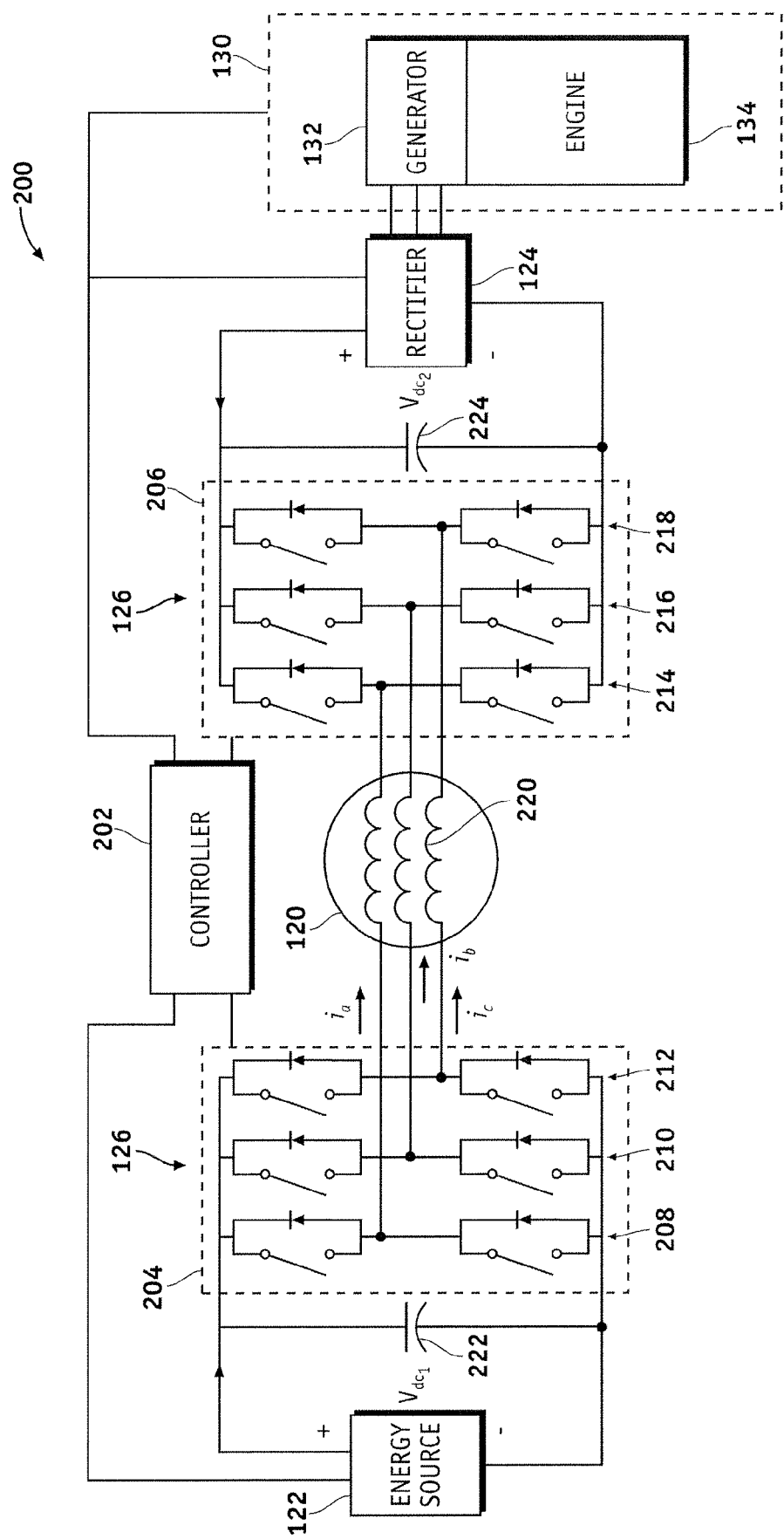
FIG. 2 is a schematic view of an embodiment of a double-ended inverter system suitable for use in the automobile of FIG. 1.

Referring now to FIG. 2, a double-ended inverter system 200 may be adapted to drive the motor 120 in accordance with one embodiment. The double-ended inverter system 200 includes the motor 120 having a set of windings 220, the first energy source 122, the rectifier 124, the power inverter assembly 126, and a controller 202. In order to power the motor 120, DC power is provided from the first energy source 122 and the rectifier 124 to the first and second inverters 204, 206 of the power inverter assembly 126 respectively, which convert the DC power into AC power, as is commonly understood in the art. The first and second inverters 204 and 206 produce AC voltages across the windings 220 (or phases) based on the speed, commanded torque (i.e., commanded synchronous frame currents), and other motor parameters as is commonly understood.

Referring again to FIG. 2, the power inverter assembly 126 includes a first inverter 204 and a second inverter 206, each including six switches (e.g., semiconductor devices, such as transistors and/or switches) with antiparallel diodes (i.e., antiparallel to each switch). As shown, the switches in the inverters 204 and 206 are arranged into three legs (or pairs), with legs 208, 210, and 212 being in the first inverter 204 and legs 214, 216, and 218 being in the second inverter 206. In an exemplary embodiment, the windings 220 are electrically coupled, at opposing ends thereof, between the switches of legs 208, 210, 212 in the first inverter 204 and legs 214, 216, 218 in the second inverter 206. The double-ended inverter system 200 may also include first and second capacitors 222 and 224 respectively connected in parallel with the first energy source 122 and the rectifier 124 to smooth current ripple during operation.

In an exemplary embodiment, the first energy source 122 is coupled to the first inverter 204 and the rectifier 124 is coupled to the second inverter 206. The rectifier 124 is further coupled to the generator 132 which is coupled to an engine 134. In an exemplary embodiment, the engine 134 is an internal combustion engine which produces mechanical energy as is commonly understood. In various embodiments, the engine 134 may function as the prime mover for the automobile 110, or alternatively, may function as an auxiliary or range extending engine, as described in greater detail below.

In an exemplary embodiment, the generator 132 is mechanically coupled to the engine 134, and the generator 132 is configured to convert mechanical energy from the engine 134 to electrical energy. The rectifier 124 is electrically coupled to the generator 132, and the rectifier 124 is configured to convert the electrical energy provided by the generator 132 to a DC voltage output ($V_{DC2}$). The rectifier 124 may be a six-pulse rectifier, a twelve-pulse rectifier, or another type of rectifier suitable for the given application.

In an exemplary embodiment, the controller 202 is in operable communication and/or electrically coupled to the first and second inverters 204, 206. The controller 202 is responsive to commands received from the driver of the automobile 110 (e.g., via an accelerator pedal) and provides commands to the first inverter 204 and the second inverter 206, as will be described, to control the output of the inverters 204, 206. In alternative embodiments, the controller 202 may be further coupled to the first energy source 122, the rectifier 124, and/or the generator set 130, and the controller 202 may be configured to perform additional tasks and functions, as described in detail below.

In an exemplary embodiment, the controller 202 is configured to modulate and control the inverters 204 and 206 using high frequency pulse width modulation (PWM), as will be understood. The controller 202 provides a control algorithm that achieves desired power flow between the electrical sources coupled to the inverters 204, 206 while producing the commanded torque inside the motor 120. Many combinations of voltage across the windings 220 may produce the commanded torque in the motor 120 and achieve desired power flow to (or from) the first energy sources 122, the rectifier 124, and the motor 120. The controller 202 provides PWM signals to operate the switches within the first and second inverters 204 and 206 to cause the desired output voltages to be applied across the windings 220 within the motor 120 to operate the motor 120 with the required torque, as will be appreciated in the art.

Still referring to FIG. 2, in accordance with one embodiment, the double-ended inverter system 200 is configured to initially provide power to the motor 120 from the first energy source 122 independently, as described in greater detail below. The first energy source 122 may be a battery designed to provide sufficient power to drive the motor 120 for a given period of time and/or traveling distance. After the period of time, the rectifier 124 and/or the generator set 130 may begin providing power to the motor 120 and/or the first energy source 122 as described in greater detail below.

Figure 3:
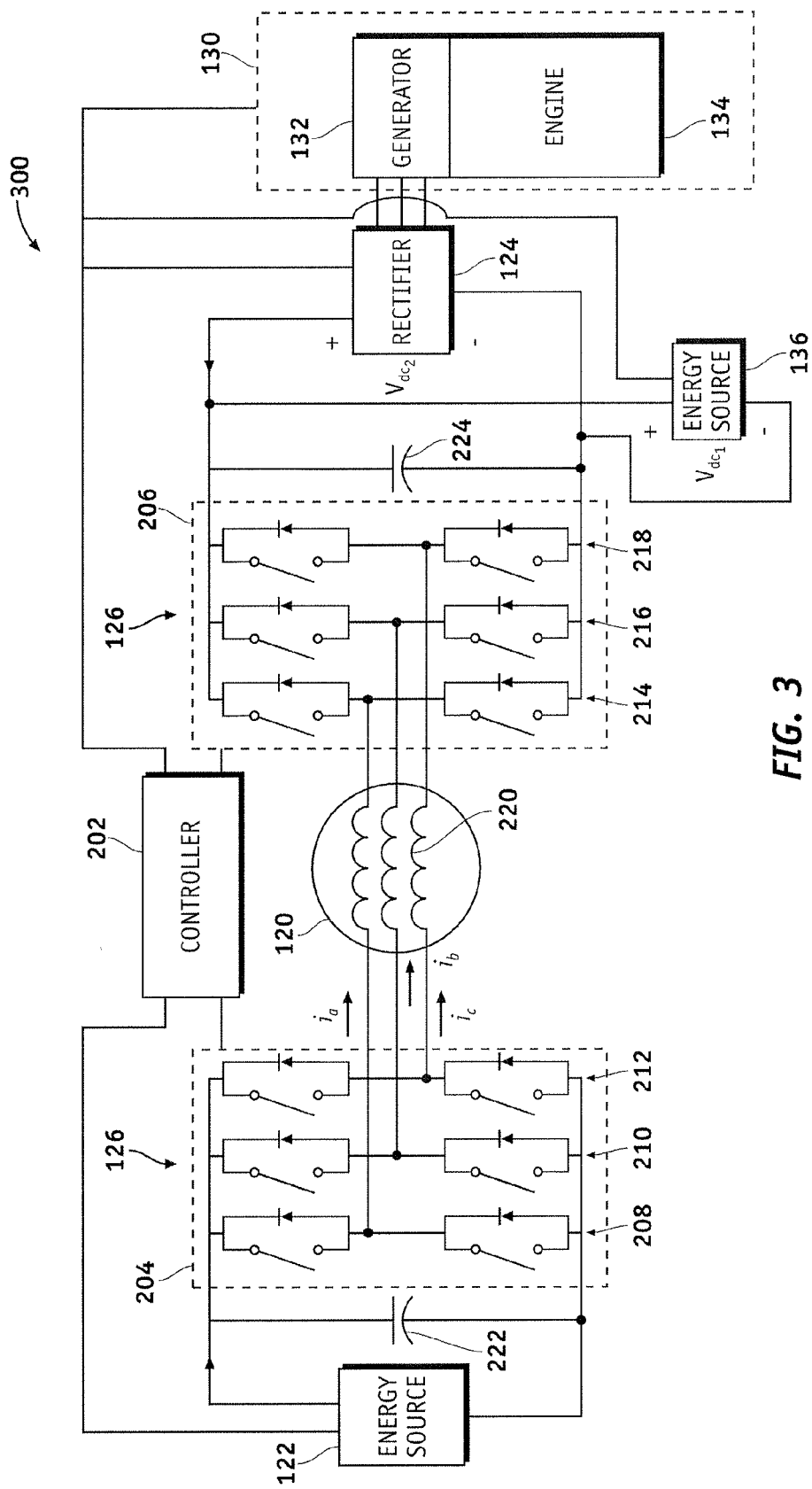
FIG. 3 is a schematic view of another embodiment of a double-ended inverter system suitable for use in the automobile of FIG. 1.

Referring now to FIG. 3, a double-ended inverter system 300 may be adapted to drive the motor 120 in accordance with one embodiment. In an exemplary embodiment, the double-ended inverter system 300 includes the motor 120, the first energy source 122, the rectifier 124, the power inverter assembly 126, the second energy source 136, and a controller 202. Some of the elements of the double-ended inverter system 300 are similar to their counterpart elements described above with reference to FIGS. 1-2 and will not be redundantly described in detail in the context of FIG. 3.

Still referring to FIG. 3, in an exemplary embodiment, the second energy source 136 is coupled to the second inverter 206 such that the rectifier 124 and the second energy source 136 are electrically parallel. In accordance with one embodiment, the first energy source 122 is an ultracapacitor configured to act as a high-power energy source for recapturing regenerative braking energy, and the second energy source 136 is a battery configured to provide the primary traction power to the motor 120. In this configuration, the second energy source 136 provides a stable energy source when rectifier 124 and/or generator set 130 is producing a relatively low electrical output (or no electrical output). In an exemplary embodiment, the voltage output of the rectifier 124 is substantially equal to the voltage of the energy source 122 (e.g., $V_{DC1}=V_{DC2}$). When the rectifier 124 and/or generator set 130 is producing electrical output, the rectifier 124 may be used to charge the second energy source 136 (i.e., perform a function similar to a conventional automobile alternator) and/or provide power to the motor 120 using the double-ended inverter system 300 as described in greater detail below.

Figure 4:
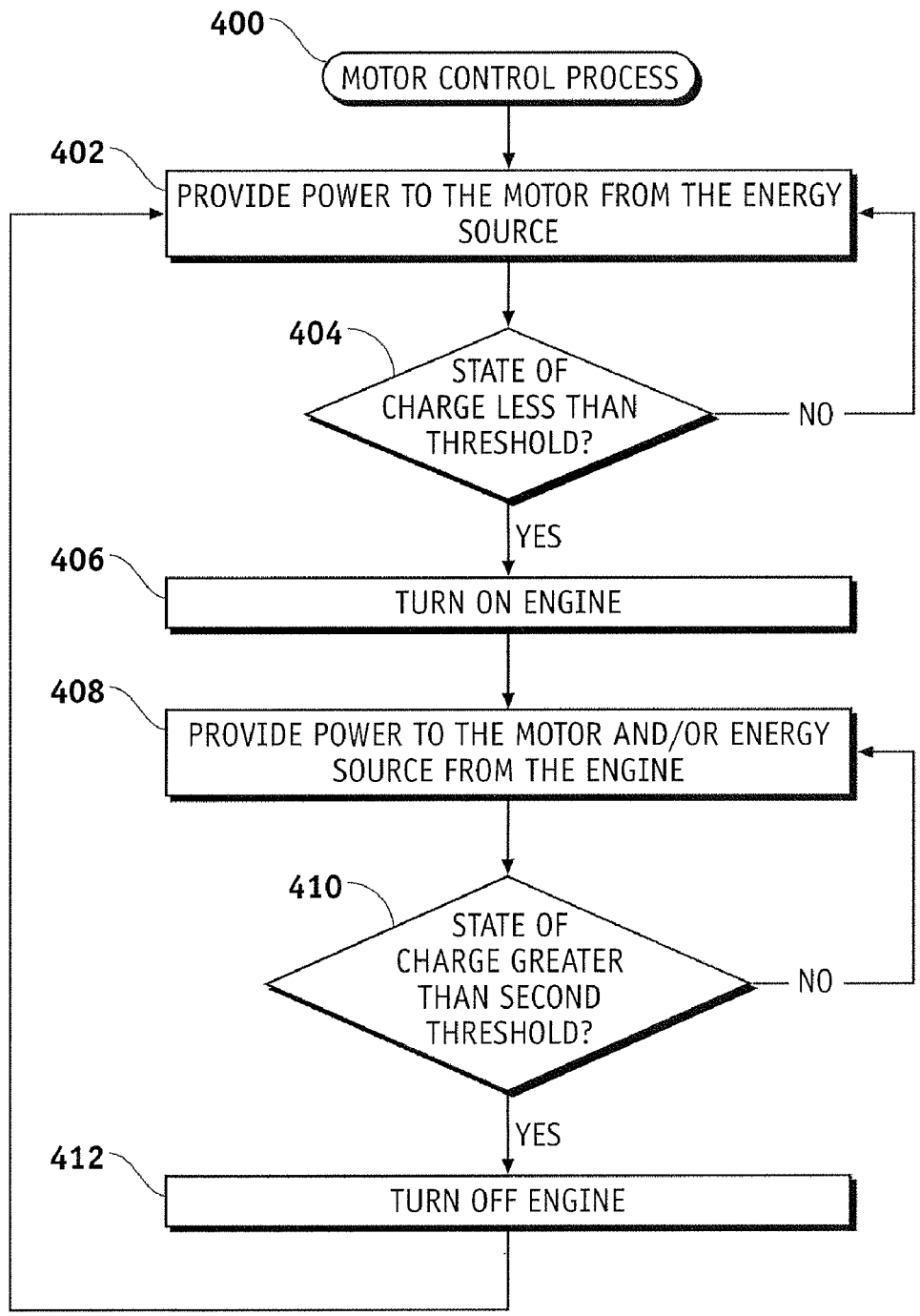
FIG. 4 is a flow diagram of a motor control process in accordance with one embodiment.

Referring now to FIG. 4, in an exemplary embodiment, a double-ended inverter system 200, 300 may be configured to perform a motor control process 400 and additional tasks, functions, and operations described below. The various tasks may be performed by software, hardware, firmware, or any combination thereof. For illustrative purposes, the following description may refer to elements mentioned above in connection with FIGS. 1-3. In practice, the tasks, functions, and operations may be performed by different elements of the described system, such as the controller 202 or the electronic control system 118. It should be appreciated any number of additional or alternative tasks may be included, and may be incorporated into a more comprehensive procedure or process having additional functionality not described in detail herein.

Referring again to FIG. 4, the motor control process 400 may be initiated in response to a signal or command from a vehicle control module (e.g., an electronic control unit or ECU) upon startup of the vehicle. In an exemplary embodiment, the double-ended inverter system provides power to the motor from an energy source (task 402). In this configuration, the energy source is chosen to be the primary source of traction power, at least during the initial phase of operating the vehicle.

During operation of the vehicle, the motor control process 400 may be configured to monitor the state of charge of the energy source and determine whether the state of charge is less than a threshold value (task 404). The state of charge of an energy source is representative of its available energy capacity reflecting the amount of energy remaining, and thus gives an indication of how much longer an energy source will continue to perform. A lower state of charge indicates a lower remaining energy capacity, and conversely, a higher state of charge indicates a higher remaining energy capacity. In an exemplary embodiment, the threshold value represents a desired lower limit state of charge for the given energy source. In accordance with one embodiment, the lower limit state of charge is chosen to maximize use of the energy source while also optimizing the longevity (or life) of the energy source. For example, the threshold value may be approximately 10-20% of the initial (or full) state of charge for the energy source to limit the amount of charge used, which tends to reduce the longevity of energy sources (e.g., a battery). Lowering the threshold will use more energy from the energy source, however, using more energy may also reduce the longevity of the energy source, and vice versa.

In an exemplary embodiment, if the state of charge is less than the threshold value, the motor control process 400 may be configured to turn on or start (e.g., by providing a command or signal to the engine) the engine coupled to the double-ended inverter system (via the generator and the rectifier) (task 406). In this embodiment, the engine and generator set functions as a range extending generator, as the energy source would otherwise become depleted and incapable of providing further traction power (i.e., the range of operation is limited by the energy source). It should be understood that in alternative embodiments, the engine may instead function as the prime mover for the vehicle and already be operating, wherein task 406 is unnecessary.

In an exemplary embodiment, the engine and/or the generator set has an optimum operating point that produces a peak energy efficiency, where the ratio of output energy (i.e., electrical energy from the generator) relative to input energy (i.e., fuel used by engine) is a maximum. In an exemplary embodiment, the engine and/or generator may be preconfigured to operate substantially near this optimum operating point, or the motor control process 400 may command the engine and/or generator to an operating point substantially near the optimum operating point. By operating the engine and/or generator at or near a peak efficiency, the overall fuel economy of the engine and the vehicle is improved.

In an exemplary embodiment, the motor control process 400 provides power to the motor and/or the energy source depending on the demands of the system by varying the modulation commands provided to the inverters (task 408). For example, if the motor requires more power (i.e., more torque) than the engine can provide, then the inverters in the double-ended inverter system may be modulated to provide power to the motor from both the energy source and the engine (via the generator and rectifier). Alternatively, if the motor requires less power (i.e., less torque) than what the engine is producing (via the generator and rectifier), the inverters may be modulated to charge the energy source using the excess electrical energy.

In an exemplary embodiment, the motor control process 400 is configured to monitor the state of charge of the energy source and determine whether the state of charge exceeds a second threshold value (task 410). This second threshold value corresponds to an upper limit state of charge for the energy source. The second threshold value may be based on safety and/or reliability (i.e., to prevent overcharging) or for fuel economy and/or efficiency reasons (i.e., the energy source is sufficiently charged such that the engine may be turned off). For example, the second threshold may be approximately 80-90% of the initial state of charge of the energy source. Depending on the embodiment, the threshold values for charging and/or discharging the energy source in connection with task 404 and task 410 may be adjusted to maximize efficiency (e.g., the use of electric and/or regenerative sources relative to non-regenerative sources such as fuels) and/or optimize the longevity of the energy source as desired.

In an exemplary embodiment, if the state of charge is greater than the second threshold value, the motor control process 400 is configured to turn off or stop the engine (e.g., by providing a command or signal to the engine) (task 412). Turning off the engine when it is no longer necessary allows the double-ended inverter system to minimize fuel consumption and maximize the use of electrical energy during operation of the vehicle. The motor control process 400 may then resume providing power to the motor from the electrical energy source(s), and may repeat the loop defined by tasks 402, 404, 406, 408, 410, 412 indefinitely during operation of the vehicle.

The systems and/or methods described above provide a way to extend the operating range of an electric and/or hybrid vehicle while minimizing fuel consumption. Other features of a double-ended inverter system, such as various power flows or power transfer, may also be achieved. As described above, the performance of the motor is not impaired and the commanded torque may still be generated within the motor, while allowing excess power to charge the energy sources.

Other embodiments may utilize system and method described above in different types of automobiles, different vehicles (e.g., watercraft and aircraft), or in different electrical systems altogether, as it may be implemented in any situation where mechanical energy is used to extend the range of a primarily electric drive system. Further, the motor and the inverters may have different numbers of phases, and the systems described herein should not be construed as limited to a three-phase design. The basic principles discussed herein may be extended to higher-order phase systems as will be understood in the art. Other forms of energy sources may be used, such as current sources and loads including diode rectifiers, thyristor converters, fuel cells, inductors, capacitors, and/or any combination thereof.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:
1. An electric drive system for a vehicle comprising:
    an electric motor configured to provide traction power to the vehicle;
    a first inverter coupled to the electric motor, the first inverter being configured to provide alternating current to the electric motor;

a first energy source coupled to the first inverter, wherein the first inverter is configured to provide power flow between the first energy source and the electric motor;

a second inverter coupled to the electric motor, the second inverter being configured to provide alternating current to the electric motor;

an internal combustion engine configured to provide mechanical energy;

a generator coupled to the internal combustion engine, the generator being configured to convert mechanical energy from the internal combustion engine to electrical energy;

a rectifier coupled to the second inverter and the generator, the rectifier being configured to produce a direct current output from the electrical energy provided by the generator, wherein the second inverter is configured to provide power from the rectifier to the electric motor; and a controller coupled to the first inverter, the second inverter, the first energy source, and the internal combustion engine, wherein the controller is configured to:
monitor a state of charge of the first energy source; and
if the state of charge is less than a threshold value:
start the internal combustion engine;
operate the first inverter and the second inverter to provide charging power to the first energy source from the internal combustion engine; and
stop the internal combustion engine after starting the internal combustion engine if the state of charge is greater than a second threshold value, the second threshold value being greater than the first threshold value.

2. The electric drive system of claim 1, the internal combustion engine having a designated operating point corresponding to a peak energy efficiency, wherein the controller is configured to operate at the internal combustion engine at an operating point substantially near the designated operating point.

3. The electric drive system of claim 1, wherein the first energy source is a battery.

4. A method for controlling an electric motor using a double-ended inverter system including a first inverter coupled to a first energy source and a second inverter coupled to a rectifier, the first energy source having a state of charge, wherein the rectifier is coupled to a generator which is coupled to an internal combustion engine, the method comprising:
modulating the first inverter to provide power to the electric motor from the first energy source, the first inverter being coupled between the first energy source and the electric motor;
monitoring the state of charge of the first energy source; and
if the state of charge is less than a threshold value:
starting the internal combustion engine;
modulating the second inverter to provide power to the electric motor from the internal combustion engine through the generator and the rectifier, the second inverter being coupled between the rectifier and the electric motor; and
stopping the internal combustion engine after starting the internal combustion engine if the state of charge is greater than a second threshold value.

5. The method of claim 4, further comprising modulating the double-ended inverter system to provide power to the electric motor from the rectifier.

6. The method of claim 4, further comprising modulating the double-ended inverter system to charge the first energy source from the rectifier.

* * * * *